(12) United States Patent
Sankar Narayanan

(10) Patent No.: US 11,873,931 B2
(45) Date of Patent: Jan. 16, 2024

(54) QUICK CONNECTOR WITH VERIFICATION AND ASSEMBLY CHECK

(71) Applicant: A. RAYMOND ET CIE, Grenoble (FR)

(72) Inventor: Jai Viknesh Sankar Narayanan, Clinton Township, MI (US)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 18/031,930

(22) PCT Filed: Feb. 9, 2022

(86) PCT No.: PCT/IB2022/051174
§ 371 (c)(1),
(2) Date: Apr. 14, 2023

(87) PCT Pub. No.: WO2022/172176
PCT Pub. Date: Aug. 18, 2022

(65) Prior Publication Data
US 2023/0408012 A1 Dec. 21, 2023

Related U.S. Application Data

(60) Provisional application No. 63/148,712, filed on Feb. 12, 2021.

(51) Int. Cl.
*F16L 37/098* (2006.01)
(52) U.S. Cl.
CPC ....... *F16L 37/0985* (2013.01); *F16L 2201/10* (2013.01)

(58) Field of Classification Search
CPC . F16L 37/098; F16L 37/0985; F16L 37/0982; F16L 37/12; F16L 37/133; F16L 2201/10; F16L 2201/60
See application file for complete search history.

(56) References Cited

U.S. PATENT DOCUMENTS 5,152,555 A 10/1992 Szabo
6,328,344 B1 12/2001 Tozaki et al.
(Continued)

FOREIGN PATENT DOCUMENTS

CN 204083601 U 1/2015
CN 104295836 B 3/2016
(Continued)

OTHER PUBLICATIONS

International Search Report and Written Opinion of the International Searching Authority for PCT/IB2022/051174, dated Apr. 29, 2022, 13 pages.

*Primary Examiner* — Aaron M Dunwoody
(74) *Attorney, Agent, or Firm* — WARNER NORCROSS + JUDD, LLP

(57) ABSTRACT

An improved quick connector is provided. The quick connector includes an assembly check that is partially received within an input end of a connector body. The assembly check includes a pull tab and a shielding portion. Upon insertion of a male connector within the input end of the connector body, assembly check retracts from the input end of the connector body and can be manually removed via the pull tab. Once removed from the connector body, a machine readable verification indicia can be read. The verification indicia is visible on an underside of the shielding portion or visible on the connector body once the shielding portion is removed.

13 Claims, 9 Drawing Sheets

(56) References Cited

U.S. PATENT DOCUMENTS

| | | |
|---|---|---|
| 7,401,818 B2 | 7/2008 | Takayanagi |
| 9,016,729 B2 | 4/2015 | Ishida et al. |
| 2008/0084064 A1 | 4/2008 | Kerin et al. |
| 2014/0084583 A1 | 3/2014 | Hemingway et al. |
| 2019/0234547 A1 | 8/2019 | Gauthier |

FOREIGN PATENT DOCUMENTS

| | | | | |
|---|---|---|---|---|
| DE | 102018219440 A1 * | 5/2020 | .......... | F16L 37/0841 |
| EP | 0505930 A2 | 9/1992 | | |
| EP | 0846907 A2 | 6/1998 | | |
| EP | 3736481 A1 | 11/2020 | | |
| JP | 2009024800 A | 2/2009 | | |
| JP | 5318379 B2 | 10/2013 | | |

* cited by examiner

QUICK CONNECTOR WITH VERIFICATION AND ASSEMBLY CHECK

CROSS-REFERENCE TO RELATED APPLICATIONS

This application claims the benefit of U.S. Provisional Application 63/148,712, filed Feb. 12, 2021, the disclosure of which is incorporated by reference in its entirety.

FIELD OF THE INVENTION

The present invention relates to connector assemblies to join fluid lines together, and in particular, connector assemblies providing machine readable connection verification.

BACKGROUND OF THE INVENTION

Quick connectors are often used in the automotive industry to provide a fluid connection between two components. Quick connectors function by joining the connector to a male fitting, the male fitting optionally being in conformance with SAE J2044. For example, known quick connectors engage a raised annular bead on the male fitting, thereby preventing withdrawal of the male fitting. Quick connectors can be used to connect fuel lines, fuel vapor lines, fuel tank filler necks, and in-tank fuel applications, to name but a few applications, and must adhere to stringent engineering requirements, particularly for automotive applications.

Quick connectors sometimes include a pre-installed assembly check to provide visual verification that the male fitting has engaged the quick connector. In use, the pre-installed assembly check retracts from the quick connector when the male fitting is engaged. When in the retracted position, the assembly check can be manually removed from the quick connector and discarded. In some applications, however, the pre-installed assembly check can become dislodged from the quick connector during shipment, preventing use of the quick connector by the vehicle manufacturer. Accordingly, there remains a continued need for an improved quick connector having an assembly check. In particular, there remains a continued need for an improved quick connector having a separate assembly check that can be readily assembled to the quick connector by the manufacturer for providing visual confirmation of a secure connection.

SUMMARY OF THE INVENTION

An improved quick connector assembly is provided. The quick connector includes an assembly check that is partially received within an input end of a quick connector. The assembly check is separate from the quick connector and includes a pull tab and a shielding portion. Upon insertion of a male connector within the input end of the quick connector, the assembly check retracts from the input end of the quick connector and can be manually removed via the pull tab. When the assembly check is removed from the quick connector, a machine readable verification indicia can be read. The verification indicia is visible on an underside of the shielding portion or visible on the quick connector once the shielding portion is removed.

In one embodiment, the quick connector includes a connector body and one-button or two-button sliding lock latch. The connector body defines a fluid passage between a fluid input end and a fluid output end and defines a transverse opening proximate the fluid input end. The sliding lock latch is housed within the transverse opening. The assembly check is partially received within the input end of the connector body and includes a pull tab and a shielding portion. The shielding portion is optionally a rectangular element and extends orthogonal to the pull tab. Further optionally, the shielding portion can include a locking tab on a distal end thereof for engaging a collar portion of the connector body. The underside of the shielding portion includes a visual indicia, optionally a machine readable visual indicia, and further optionally a QR code or a bar code. Upon insertion of a male connector within the input end of the connector body, the assembly check retracts from the input end of the connector body and can be manually removed via the pull tab, such that the verification indicia is visible on the underside of the shielding portion.

In another embodiment, the assembly check does not include a verification indicia but extends over a verification indicia on the connector body to conceal the verification indicia from view. Upon insertion of a male connector within the input end of the connector body, the assembly check retracts from the input end of the connector body and can be manually removed via the pull tab. Once removed, the verification indicia is visible on the connector body. The shielding portion is optionally a rectangular element and extends orthogonal to the pull tab. The shielding portion can include a locking tab on a distal end thereof for engaging a collar portion of the connector body. The verification indicia is optionally a machine readable verification indicia, and further optionally a QR code or a bar code.

These and other features and advantages of the present invention will become apparent from the accompanying description of the invention, when viewed in accordance with the accompanying drawings and appended claims.

DETAILED DESCRIPTION OF THE CURRENT EMBODIMENT

Figure 1:
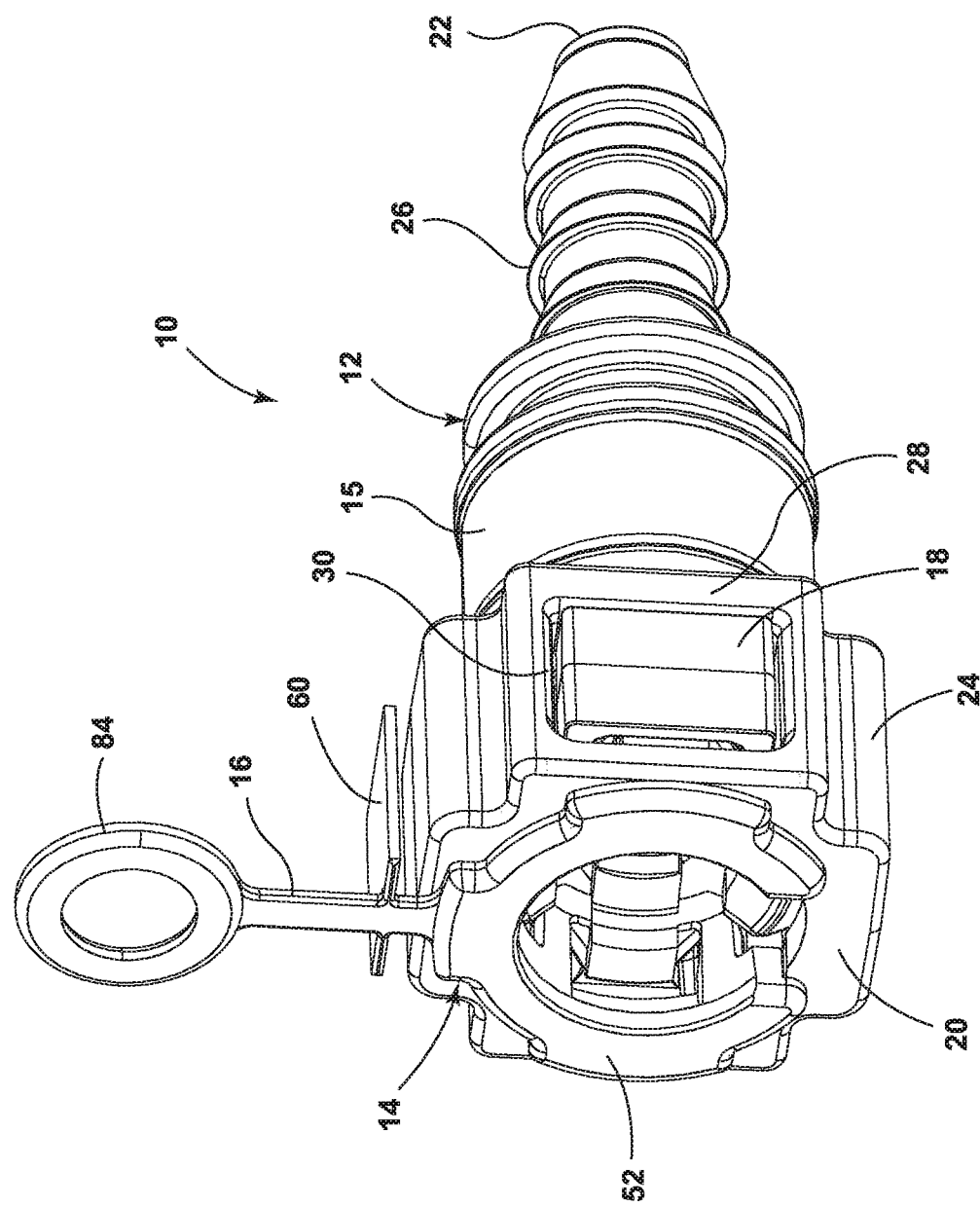
FIG. 1 is a perspective view of a quick connector and an assembly check.
Figure 2:
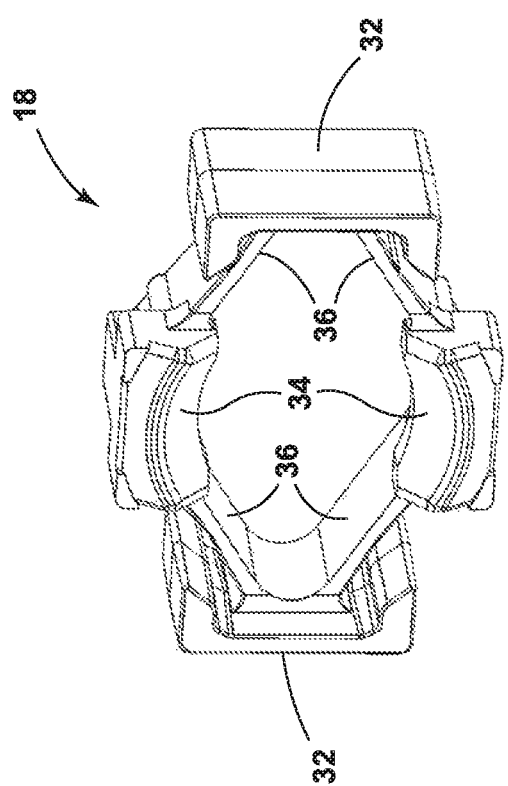
FIG. 2 is a perspective view of a two-button sliding lock latch.

Referring to FIGS. 1-9, a quick connector assembly in accordance with embodiments of the present invention is illustrated and generally designated 10. The quick connector assembly 10 includes a quick connector 12 and an assembly check 14, the assembly check 14 being separate from the quick connector 12. Upon insertion of a male connector 100 within the input end of the quick connector 12, the assembly check 14 retracts from the input end of the quick connector 12 and can be manually removed via a pull tab 16. Once removed from the quick connector 12, a machine readable verification indicia can be read. Each such feature of the quick connector assembly 10 is separately discussed below. Though primarily described below in connection with fuel lines, the quick connector assembly 10 can be used in other applications as desired, including the connection of brake lines and coolant lines for example.

As shown in FIG. 1, the quick connector 12 includes a connector body 15 and an optional sliding lock latch 18. The connector body 15 defines a fluid passage between an input end 20 and an output end 22. The terms "input end" and "output end" are recited for clarity and are not intended to be limiting, as the moving fluid (e.g., fuel, oil, coolant) may move in the opposite direction in some applications. The connector body 15 further includes an enlarged connector collar 24 at the input end 20 and a barbed stem 26 and the output end 22. The connector body 15 comprises a straight coupling in the illustrated embodiment. In other embodiments the connector body 15 can comprise an angled coupling between two fluid lines. For example, the connector body 15 can comprise an elbow fitting, such that the fluid passage includes an approximately ninety-degree bend between the input end 20 and the output end 22. The connector body 15 can be formed from any suitable material, optionally a durable, chemical-resistant and lightweight polymerized material.

As best shown in FIG. 1, the connector collar 24 includes a sidewall 28 that defines a transverse opening 30. The transverse opening 30 is shaped to receive the sliding lock latch 18. The sliding lock latch 18 includes a two-button sliding lock latch in the illustrated embodiment, while other configurations can be used in other embodiments, including a single-button sliding lock latch. In particular, the sliding lock latch 18 of FIG. 2 comprises a flexible retainer having a pair of externally accessible buttons 32. The externally accessible buttons 32 are connected to a pair of laterally moveable snap-fit barbs 34 by diagonal bridging arms 36. Each snap fit barb 34 is arcuate when viewed from an end, and is also tapered with a greater diameter closest to the female end. The snap-fit barbs 34 prevent removal of the male connector 100 from the quick connector 12. However, when it is desired to remove the male connector 100 from the quick connector 12, an operator depresses the opposing buttons 32 toward an axial centerline of the quick connector body 15 while pulling out the male connector 100. Inward movement of the buttons 32 serves to laterally expand the barbs 34 away from the centerline. It should be noted that alternate configurations of quick connectors can be used in other embodiments, including dual-latch and single-latch quick connectors for example.

Figure 3:
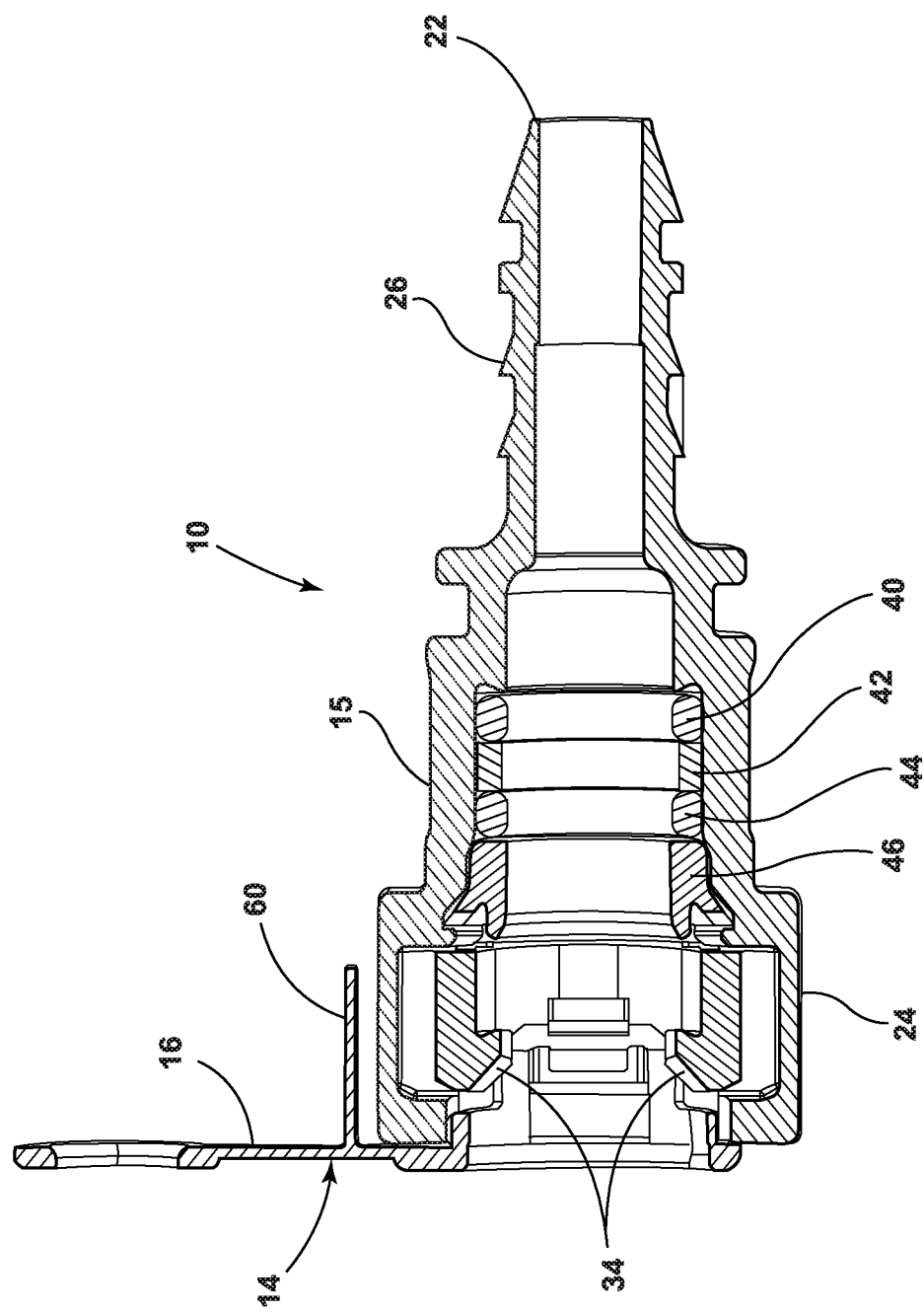
FIG. 3 is a cross-sectional view of the quick connector of FIG. 1.

In addition to the sliding lock latch 18 noted above, the connector body 15 houses a primary O-ring 40, a spacer 42, a secondary O-ring 44, and a seal lock washer 46, each being visible in cross-section in FIG. 3. Collectively, the primary O-ring 40, the spacer 42, the secondary O-ring 44, and the seal lock washer 46 provide a seal arrangement, however a seal arrangement is not required and other seal arrangements can be used in other embodiments.

Figure 4:
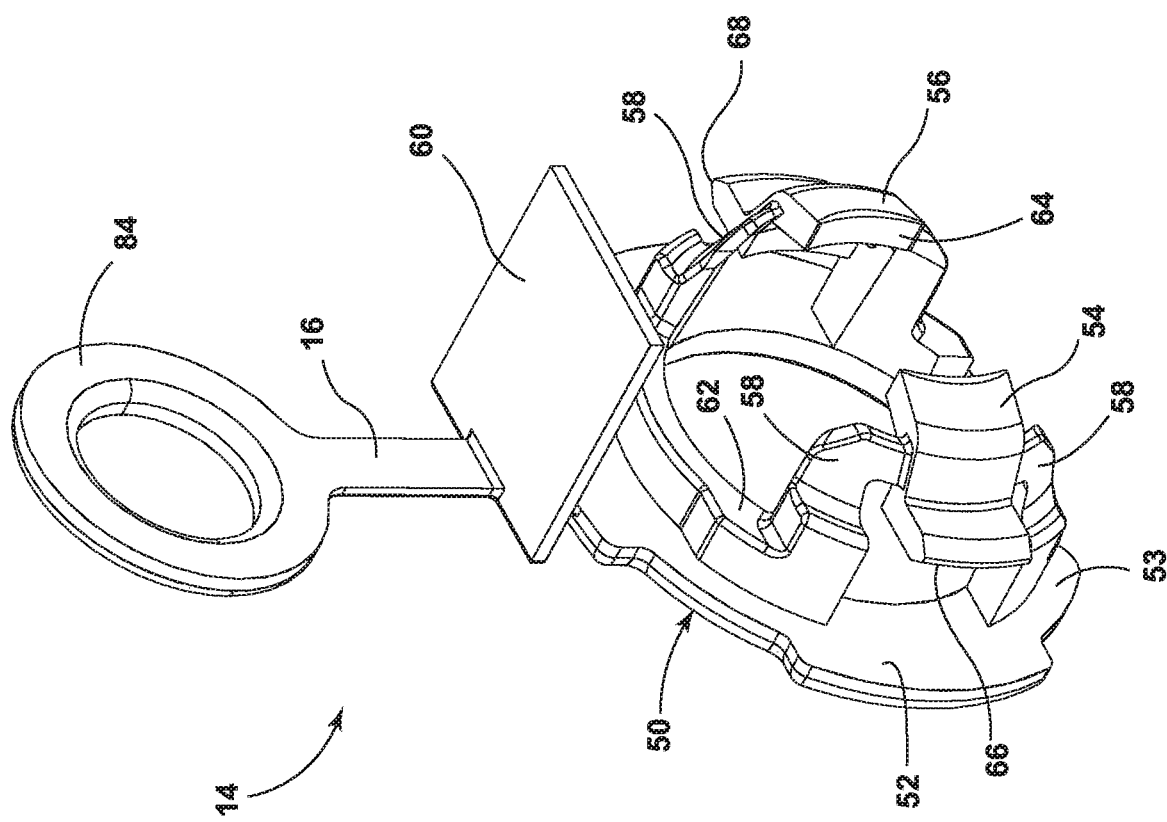
FIG. 4 is a first perspective view of the assembly check of FIG. 1.
Figure 5:
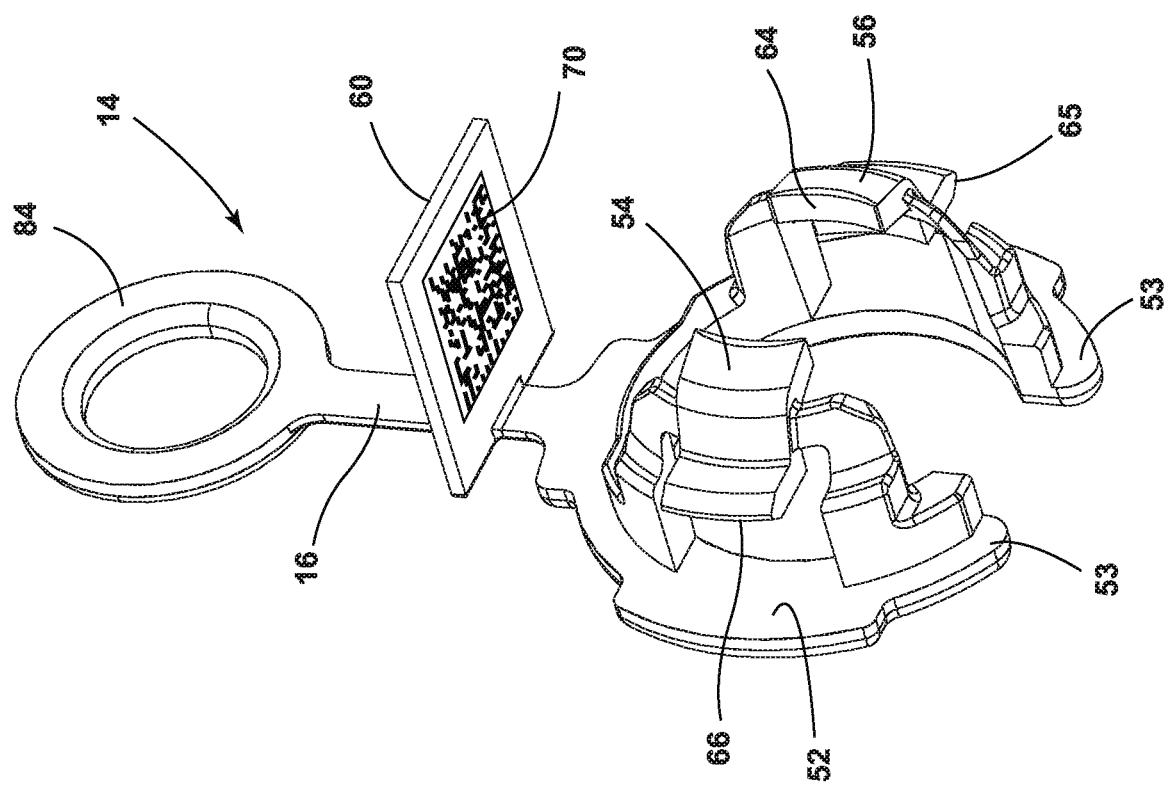
FIG. 5 is a second perspective view of the assembly check of FIG. 1.

Referring to FIGS. 4-5, an assembly check 14 in accordance with a first embodiment is illustrated. The assembly check 14 includes the above pull tab 16 in combination with a body portion 50 and a shielding portion 60. The body portion 50 includes a C-shaped flange 52 that partially surrounds the opening at the input end 20 of the connector body 15. The C-shaped flange 52 includes first and second terminal portions 53 that are spaced apart from each other by a distance at least equal to the outer diameter of the male fitting 100, such that the C-shaped flange 52 can be removed from the male fitting 100 by pulling on the pull tab 16. The body portion 50 also includes first and second locking tabs 54, 56 and first and second retention tabs 66, 68. The first locking tab 54 and the first retention tab 66 comprise a first S-shaped element that is rotatably supported by adjacent mounting arms 58, the mounting arms protruding from an axial projection 62. Similarly, the second locking tab 56 and the second retention tab 68 comprise a second S-shaped element that is rotatably supported by adjacent mounting arms 58. The locking tabs 54, 56 extend radially inward, and the retention tabs 66, 68 extend radially outward. The assembly check 14 can be integrally formed from any suitable material, for example a thermoplastic resin, optionally a nylon resin, such that the mounting arms 58, the locking tabs 54, 56, and the retention tabs 66, 68 are integrally joined to each other.

Each locking tab 54, 56 includes a ramped engagement surface 64 for deflecting the locking tab 54, 56 when engaged by the raised annular bead 102 of a male fitting 100. Each engagement surface 64 is arcuate when viewed from an end, and is also tapered with a greater diameter closest to the input end. The raised annular bead 102 causes rotation of the locking tabs 54, 56 via torsion of the mounting arms 58. Rotation of the locking tabs 54, 56 causes rotation of the retention tabs 66, 68 via a see-saw action. Rotation of the retention tabs 66, 68 releases the retention tabs 66, 68 from their engagement with the inner annular surface of the quick connector collar 24. In particular, the retention tabs 66, 68 no longer engage the quick connector collar 24, and the assembly check 14 moves against the direction of the male fitting 100, away from the opening at the input end 20 of the connector body 15.

As also shown in FIGS. 4-5, the shielding portion 60 extends orthogonally from the pull tab 16. The shielding portion 60 is rectangular, being generally coextensive with the quick connector collar 24 and vertically offset from the collar 24. In some embodiments, the underside of the shielding portion 60 includes a verification indicia 70. In other embodiments as discussed below in connection with FIG. 7, the verification indicia 70 is applied to the collar 24, rather than to the shielding portion 60. In these and other embodiments, the verification indicia 70 comprises a visual cue to indicate that the quick connector 12 is fully seated over a male fitting 100. The verification indicia 70 can include for example a one-dimensional barcode (e.g. UPC code, EAN code, code 39, code 128, ITF, code 93, codabar, GS1 databar, MSI Plessey, etc.), a two-dimensional barcode (e.g. QR code, datamatrix code, PDF417, AZTEC, etc.), a holographic code, a human-readable alpha-numeric code, or other codes, whether known or hereinafter developed, that are interpretable by machine or human. In other embodiments the indicia 70 is not machine readable and includes a color, a pattern, an icon, or other feature.

Figure 6:
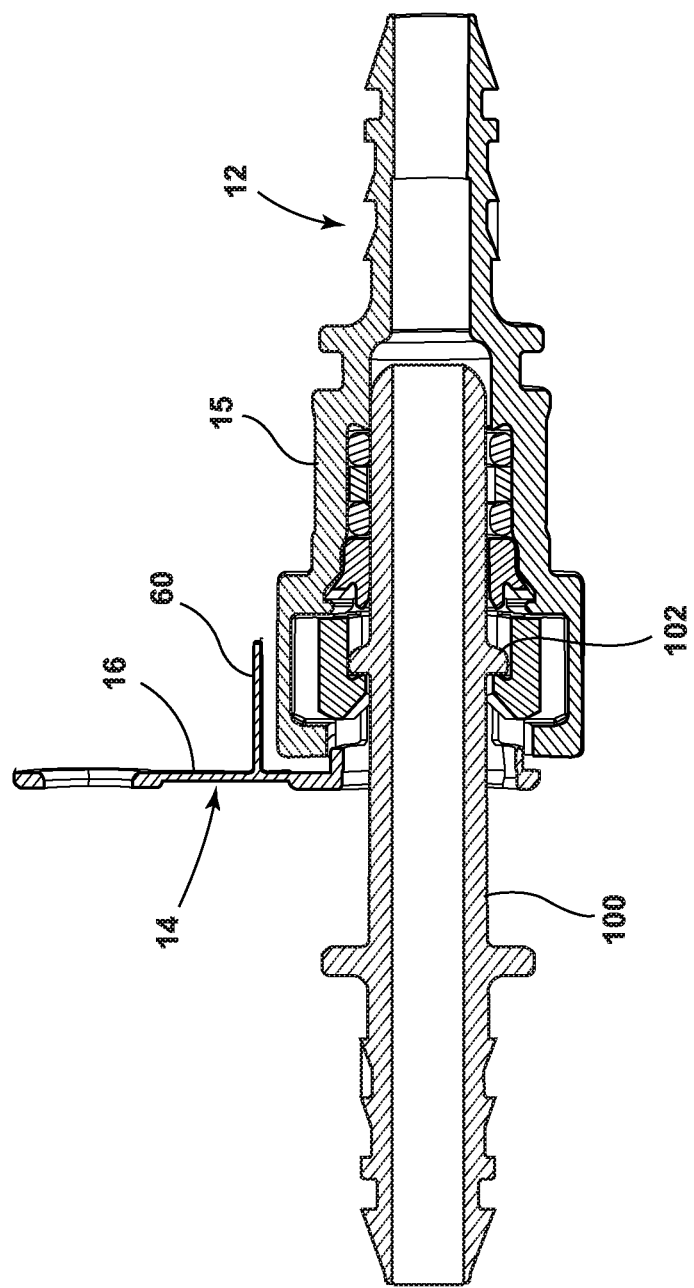
FIG. 6 is a cross-sectional view of a male connector within a quick connector.

In use, the assembly check 14 pops out from the quick connector 12 when the quick connector is fully inserted over a male fitting 100, generally shown in FIG. 6. In particular, the raised annular bead 102 causes rotation of the locking tabs 54, 56, which causes rotation of the retention tabs 66, 68. Rotation of the retention tabs 66, 68 releases the retention tabs 66, 68 from their engagement with the inner annular surface of the quick connector collar 24, and the assembly check 14 moves against the direction of the male fitting 100, away from the opening at the input end 20 of the connector body 15. The operator then pulls the assembly check 14 vertically, e.g., in the direction of the pull tab 16.

Figure 7:
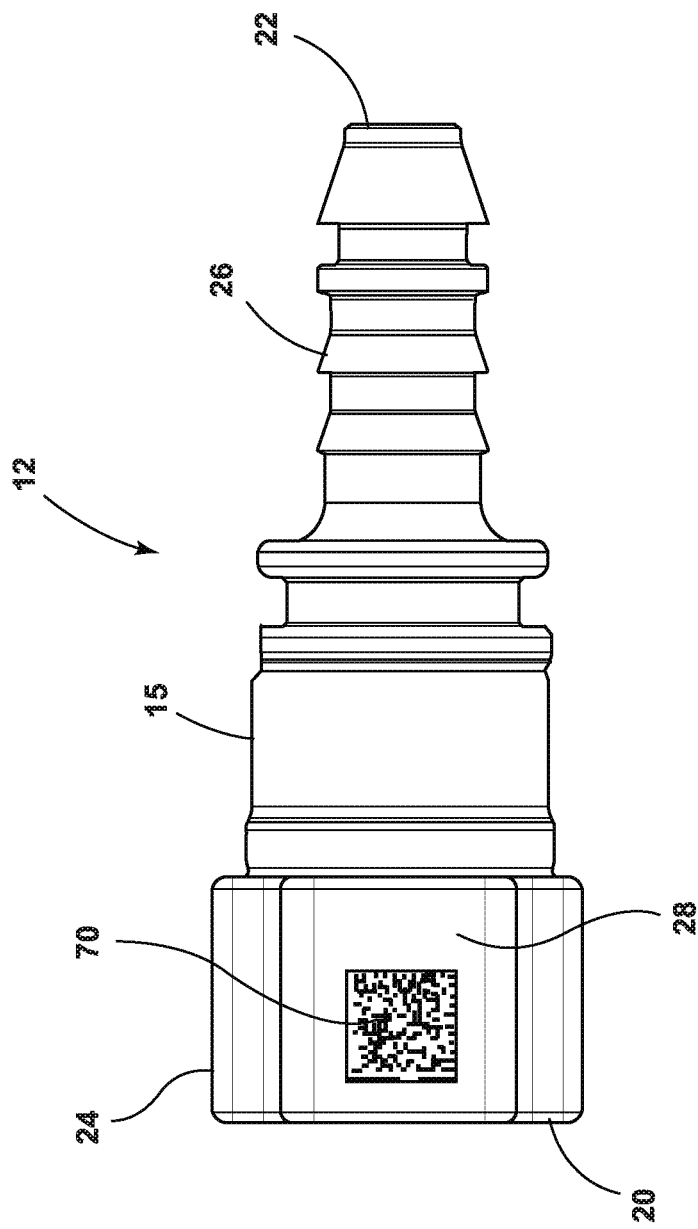
FIG. 7 is an elevation view of a quick connector including a data matrix.

The assembly check 14 is not part of the final assembly, however the operator can scan the verification indicia 70 to confirm assembly of the quick connector 12 onto the male fitting 100. In other embodiments, the verification is printed on, or supported by, the quick connector collar 24, for example as shown in FIG. 7, such that the verification indicia becomes visible only after removal of the assembly check 14.

Figure 8:
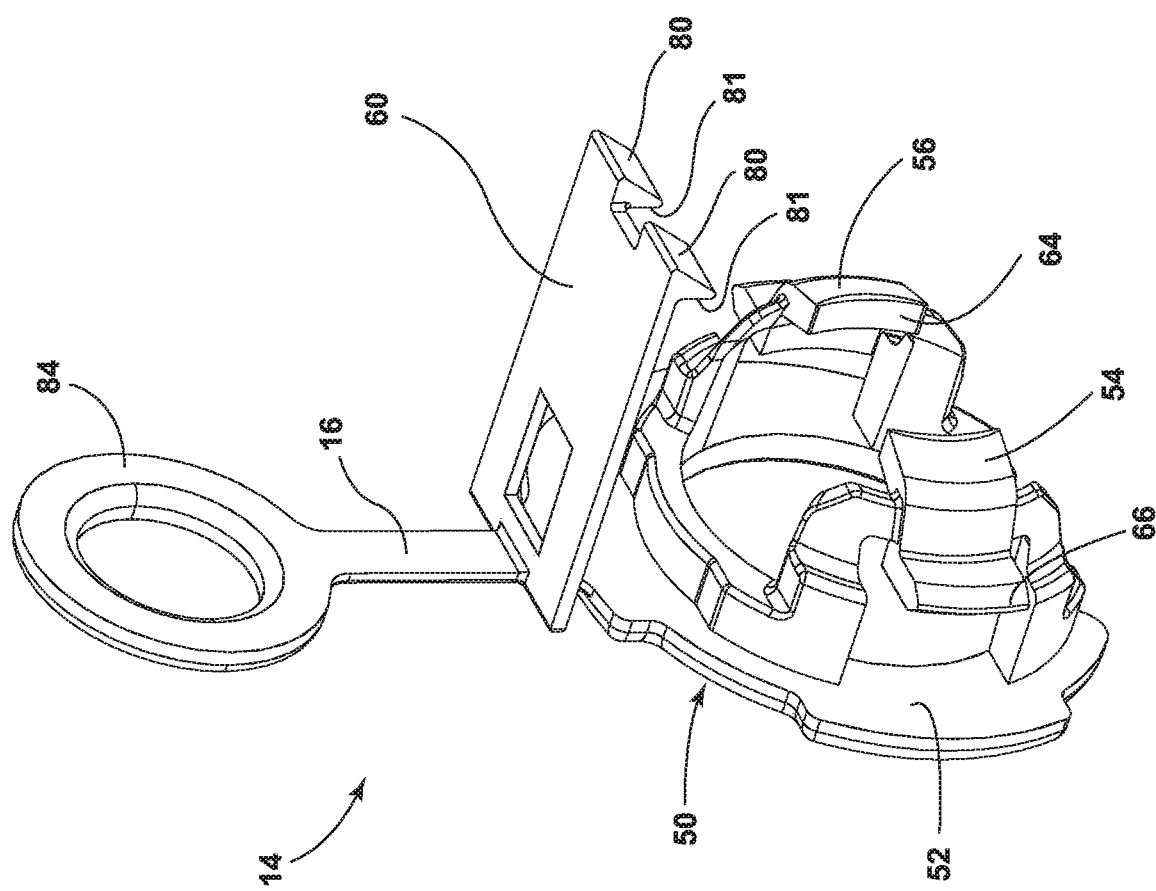
FIG. 8 is a perspective view of an assembly check including locking projections.
Figure 9:
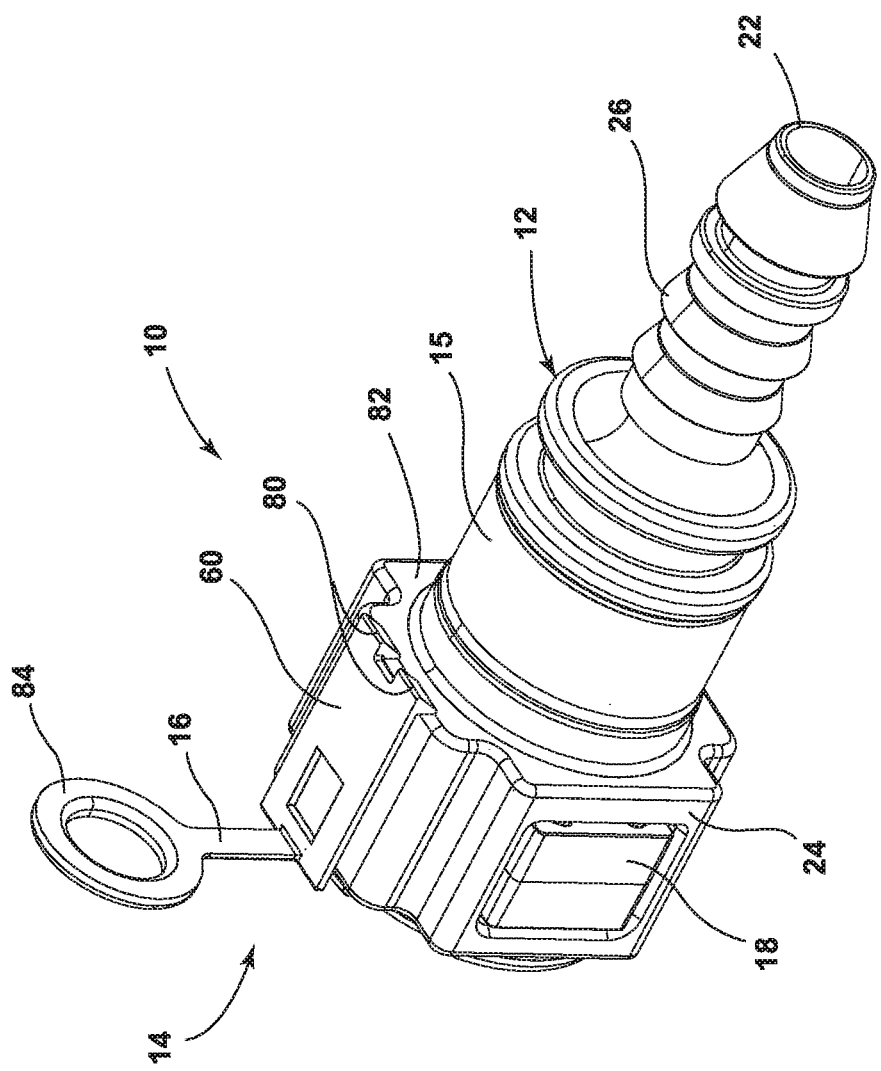
FIG. 9 is a quick connector including the assembly check of FIG. 8.

As further optionally shown in FIGS. 8 and 9, the shielding portion 60 can extend beyond the collar 24 and can include at least one ramped projection 80. The ramped projection 80 extends downwardly from the distal edge of the rectangular shielding portion 60, farthest from the pull tab 16. In addition, the ramped projection 80 includes a flat surface 81 that extends perpendicular to the shielding portion 60. The flat surface 81 abuts a rearward-facing surface 82 of the quick connector collar 24 to prevent accidental removal of the assembly check 14. The pull tab 16 can rotate relative to the shielding portion 60 (clockwise in the illustrated views). In this respect, the body 50 of the assembly check 14 can retract from the input end of the quick connector 12 while the shielding portion 60 remains in position over the quick connector collar 24. Advantageously, the ramped projection 82 improves retention of the assembly check 14 to the quick connector 12. The verification indicia 70 is applied directly to the underside of the shielding portion 60 (as in FIGS. 4-5) or to the quick connector collar 24 (as in FIG. 7). The verification indicia 70 becomes visible only after the shielding portion 60 is removed from the collar 24, which is performed by pulling on the pull tab 16.

To reiterate, the embodiments discussed above include an assembly check 14 that is partially received within an input end of a quick connector 12. The assembly check 14 has broad versatility and can be shipped separately from the quick connector 12 or pre-installed within the input end of the quick connector 12 (e.g., shipped as shown in FIG. 1). Upon insertion of a male connector 100 within the input end of the quick connector 12, the assembly check 14 retracts from the input end of the quick connector 12 (e.g., as shown in FIG. 6) and can be manually removed via the pull tab 16, which can terminate in a loop or an eyelet 84 for gripping and removal. When the assembly check 14 is removed from the quick connector 12, a verification indicia 70 can be read. The verification indicia 70 is visible on an underside of the shielding portion 60 or visible on the quick connector collar 24. The shielding portion 60 protects the verification indicia 70 from being scanned accidentally before final assembly is complete. Once the verification indicia 70 is visible, the operator can scan the bar code (or other indicia) to verify a secure attachment of the quick connector 12 to the male connector 100, for example a fuel line. The quick connector 12 and assembly check 14 can be used in other applications as desired, including the connection of brake lines and coolant lines for example.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

The invention claimed is:

1. A quick connector assembly comprising:
 a connector body defining a fluid passage between a first end and a second end, the connector body including a collar proximate the first end;
 an assembly check that is partially received within the first end of the connector body, the assembly check including a pull tab and a shielding portion, the shielding portion extending over at least a portion of the collar of the connector body; and
 a verification indicia on an underside of the shielding portion or on an exterior surface of the collar beneath the shielding portion, wherein, upon insertion of a male connector within the first end of the connector body, the assembly check retracts from the connector body and can be manually removed via the pull tab, such that the verification indicia becomes viewable.

2. The quick connector assembly of claim 1, wherein the verification indicia is machine readable and includes a QR code, a bar code, or a holographic code.

3. The quick connector assembly of claim 1, wherein the shielding portion includes a tab projecting downwardly from a distal end of the shielding portion for engaging the connector body.

4. The quick connector assembly of claim 1, wherein the shielding portion is a rectangular element that extends orthogonal to the pull tab.

5. The quick connector assembly of claim 1, wherein the assembly check includes first and second locking tabs that extend radially inward.

6. The quick connector assembly of claim 5, wherein the assembly check includes first and second retention tabs that extend radially outward.

7. The quick connector assembly of claim 6, wherein the first retention tab rotates in unison with the first locking tab, and wherein the second retention tab rotates in unison with the second locking tab.

8. The quick connector assembly of claim 5, wherein the first and second locking tabs include a sloped engagement surface defining a maximum diameter nearer to the first end of the connector body.

9. The quick connector assembly of claim 1, wherein assembly check includes a C-shaped flange having first and second terminal portions that are spaced apart from each other.

10. The quick connector assembly of claim 1, further including a sliding lock latch that is housed within a transverse opening in the connector body.

11. An assembly check for a quick connector, the assembly check comprising:
- a pull tab;
- a shielding portion extending from the pull tab; and
- a body portion coupled to the pull tab, wherein the body portion includes first and second locking tabs that extend radially inward and first and second retention tabs that extend radially outward, wherein the first retention tab rotates in unison with the first locking tab, and wherein the second retention tab rotates in unison with the second locking tab,
- wherein the shielding portion includes a verification indicia that is visible on an underside of the shielding portion.

12. The assembly check of claim 11, wherein the verification indicia is machine readable and includes a QR code, a bar code, or a holographic code.

13. The assembly check of claim 11, wherein the verification indicia is human readable and includes a color, a pattern, an icon, or an alphanumeric code.

* * * * *